(12) United States Patent
Hibbard

(10) Patent No.: US 9,255,566 B2
(45) Date of Patent: Feb. 9, 2016

(54) SECTIONAL BLADE

(75) Inventor: Paul Hibbard, Singapore (SG)

(73) Assignee: Vestas Wind Systems A/S, Aarhus N (DK)

(*) Notice: Subject to any disclaimer, the term of this patent is extended or adjusted under 35 U.S.C. 154(b) by 721 days.

(21) Appl. No.: 13/578,119

(22) PCT Filed: Feb. 10, 2011

(86) PCT No.: PCT/EP2011/051931
§ 371 (c)(1),
(2), (4) Date: Aug. 9, 2012

(87) PCT Pub. No.: WO2011/098506
PCT Pub. Date: Aug. 18, 2011

(65) Prior Publication Data
US 2012/0308396 A1 Dec. 6, 2012

Related U.S. Application Data

(60) Provisional application No. 61/303,488, filed on Feb. 11, 2010.

(30) Foreign Application Priority Data

Feb. 10, 2010 (DK) .................................. 2010 70045

(51) Int. Cl.
F03D 1/06 (2006.01)

(52) U.S. Cl.
CPC ............ *F03D 1/0683* (2013.01); *F03D 1/0675* (2013.01); *F05B 2240/302* (2013.01); *Y02E 10/721* (2013.01); *Y10T 156/10* (2015.01)

(58) Field of Classification Search
CPC .. F02D 1/683; F02D 1/0675; F05B 2240/302
See application file for complete search history.

(56) References Cited

U.S. PATENT DOCUMENTS

| 2006/0127222 A1* | 6/2006 | Arelt .............................. 416/224 |
| 2009/0155084 A1 | 6/2009 | Livingston et al. |
| 2009/0162206 A1 | 6/2009 | Zirin et al. |

FOREIGN PATENT DOCUMENTS

| DE | 10235496 A1 | 2/2004 |
| EP | 1184566 A1 | 3/2002 |

(Continued)

OTHER PUBLICATIONS

International Searching Authority, International Search Report and Written Opinion issued in corresponding PCT Application No. PCT/EP2011/051931 dated Jun. 8, 2011, 11 pages.

(Continued)

Primary Examiner — Ninh H Nguyen
Assistant Examiner — Jeffrey A Brownson
(74) Attorney, Agent, or Firm — Wood, Herron & Evans, LLP

(57) ABSTRACT

A sectional blade for a wind turbine, the blade extending lengthwise between a tip and a root where the blade is attachable to a hub of a wind turbine, crosswise between a leading edge and a trailing edge, and thickness wise between a windward and a leeward outer surface. The sectional blade comprises a first blade portion and a second blade portion. The blade portions are formed as separate components and arranged to extend lengthwise in opposite directions from a junction where the blade portions join. The blade forms, in a cross section perpendicular to the lengthwise direction and through the junction, a maximum thickness location between the leading and trailing edges, the maximum thickness location being where the distance between the windward and leeward outer surfaces is larger than at any other location in this cross section. The sectional blade comprises an assembly board which is adhesively joined to an outer surface of both blade portions between the trailing edge and the maximum thickness location.

14 Claims, 2 Drawing Sheets

(56) References Cited

FOREIGN PATENT DOCUMENTS

| EP | 1584817 | A1 | 10/2005 |
| EP | 2119909 | A1 | 11/2009 |

OTHER PUBLICATIONS

Danish Patent Office, Search Report issued in corresponding DK Patent Application No. PA 2010 70045 dated Sep. 24, 2011, 4 pages.

* cited by examiner

SECTIONAL BLADE

FIELD OF THE INVENTION

The present invention relates to sectional blade for a wind turbine, the blade comprising at least a first blade portion and a second blade portion extending in opposite directions from a joint.

BACKGROUND OF THE INVENTION

Modern wind turbines comprise a plurality of wind turbine rotor blades, typically three blades, each blade having a weight of up to 15 tons and a length of up to 55 meters, or even more.

Traditionally, a blade comprises two shell parts, one defining a windward side shell part and the other one defining a leeward side shell part. Each of the shell parts are traditionally made in one piece. To reinforce such a blade, a beam- or box-shaped, longitudinal and tubular element, i.e. a spar, can act as a reinforcing beam running lengthways, i.e. in the longitudinal direction of the blade. The spar is located in the cavity between the two wind turbine shell parts and extends substantially throughout the shell cavity in order to increase the strength and stiffness of the wind turbine blade. A blade may further be reinforced by two or more spars placed lengthways side by side.

During operation of the wind turbine, each wind turbine blade is exposed to considerable loads and moments both in the lengthwise direction of the blade mainly resulting from flapwise bending of the blade, in the thickness wise direction dominated by flapwise bending moments from aerodynamic thrust loads, and in the crosswise direction dominated by edgewise loads acting on the blade.

As the size of wind turbines and thus wind turbine blades are still growing, the production facilities and the transport means must be increased to handle blades of the required size. This also increases the demand on logistics and increases the associated costs.

Wind turbine blades manufactured as sectional blades, i.e. in blade portions for later joining are known. In practice, it is difficult to obtain the necessary strength of the joints between the connected blade portions and for safely transfer of the loads and moments across the joint. It may also be difficult to make joints with suitable stiffness considering the weight constraints typically given for the blade.

SUMMARY OF THE INVENTION

It is an object of the present invention to provide an improved sectional blade comprising at least two blade portions, to provide an improved method of manufacturing such a blade, and to provide a wind turbine comprising a sectional blade.

Thus, in a first aspect, the invention provides a sectional blade for a wind turbine, the blade extending lengthwise between a tip and a root where the blade is attachable to a hub of a wind turbine, crosswise between a leading edge and a trailing edge, and thickness wise between a windward and a leeward outer surface, the sectional blade comprising a first blade portion and a second blade portion, the blade portions being formed as separate components and arranged to extend lengthwise in opposite directions from a junction where the blade portions join, the blade forming, in a cross section perpendicular to the lengthwise direction and through the junction, a maximum thickness location between the leading and trailing edges, the maximum thickness location being where the distance between the windward and leeward outer surfaces is larger than at any other location in this cross section, characterised in that the sectional blade comprises an assembly board which is adhesively joined to an outer surface of both blade portions between the trailing edge and the maximum thickness location.

As the joint between the two blade portions is transverse to the length of the blade, the blade can be made of smaller sections compared to a traditional blade being manufactured of shell parts of full-size.

The blade portions may be shorter than normal blade shells, and the blade portions may be easier to transport from a manufacturing site to an assembly site for assembling hereof, compared to blades in one piece. Furthermore, the assembly site can be situated close to the place where the turbine blade it to be used.

By manufacturing the blade of different parts, these parts may be transported unassembled, thereby facilitating transport with the possibility of reducing the associated costs.

The joint may be approximately at the middle part of the blade providing blade portions of approximately the same length. However, the blade portions may also be of different length. As an example, the first blade portion may define a main blade portion, whereas the second blade portion may define a root end portion or a tip end portion.

In an embodiment of the invention, the second blade portion may form a winglet. Winglets can attain different shapes such as e.g. a sharply bent tip in an angle from a few degrees to 90° relative to the lengthwise direction of the blade, or such as a gradually bent tip. Hereby is obtained that the blade may be transported in parts which may e.g. be relatively flat compared to a traditional blade with winglet, thereby facilitating transport with the possibility of reducing the associated costs.

The blade tip influences the performance of the wind turbine blade as well as the noise emission. By detachable mounting of the winglet to the rest of the blade, is obtained e.g. that the blade tip may by exchanged on existing wind turbines to thereby adjust the wind turbine performance or noise emission by attaching tips extending in different angles relative to the lengthwise direction of the blade or tips of different size and/or shape. Also, as the blade tip is often vulnerable to damage during transport, handling, or operation, a detachable blade tip or winglet according to the above may furthermore be advantageous in facilitating the exchange of a damaged blade tip.

As longer blades may be preferred at sites with a typically lower wind velocity, a certain type of wind turbine may be manufactured in e.g. two different designs, one with longer blades for a low wind velocity site and another with shorter blades for a high wind velocity site. As the root section may be the same for the two designs, only one of the blade portions may be exchanged depending on whether the wind turbine is to be erected at a site with a lower or higher wind velocity.

Furthermore, the blade may comprise more than one joint and thus comprise more than two blade portions and may comprise an assembly board for each joint.

In a cross section perpendicular to the lengthwise direction and though the junction, the blade forms a maximum thickness location between the leading and trailing edges. The maximum thickness location is where the distance between the windward and leeward outer surfaces is larger than at any other location in this cross section. As there is only a small space available inside the blade at the trailing edge, an internally positioned reinforcement of the blade may be difficult to fit in at the trailing edge. Consequently, an assembly board is adhesively joined to an outer surface of both blade portions between the trailing edge and the maximum thickness location.

As the assembly board is adhesively joined to an outer surface of both blade portions, the blade portions can be joined on site, as bonding may be made on site, e.g. in a mobile workshop such as a container or similar. Furthermore, use of an adhesive for joining the blade portions via the assembly board enables a completely fixed joint with no play and renders the traditional pre-tension unnecessary.

If the blade portions need to be separated, e.g. due to repair, the assembly board could be cut through, and ground away. A new assembly board could subsequently be adhered to the outer surface of both blade portions when reassembling the blade portions.

During operation each blade is exposed to considerable loads which in the crosswise direction is dominated by edgewise loads acting on the blade. This may result in failure of a joint at which the two blade portions abut and are joined e.g. by the use of a spar. The risk of failure is increased due to the reversing nature of the edgewise loads which is reversed twice for each rotation of the blade. As the assembly board may maintain a fixed position of the blade portions relative to each other, the joint is strengthened and the risk of failure can be reduced or even removed.

In one embodiment, the distance from the assembly board to the maximum thickness location is greater than the distance from the assembly board to the trailing edge, i.e. the assembly board may be positioned closer to the trailing edge than to the maximum thickness location.

The blade may further comprise an insert extending along the lengthwise axis into both blade portion and arranged to counteract flapwise loads on the blade. I.e. the blade may comprise an insert in the form of a spar being located in the cavity between the two wind turbine shell parts and extending substantially throughout the shell cavity in order to increase the strength and stiffness of the wind turbine blade. The sectional blade may in some embodiments be reinforced by two or more spars placed lengthways side by side. The spar(s) may be positioned in the area of the maximum thickness location where most space is provided internally in the blade cavity.

A sectional blade may further comprise an assembly board both on the outer surface of the windward and the leeward side of the sectional blade. By adding an assembly board to both sides of the sectional blade, the joint may become stronger. It may further ensure a more even distribution of the loads and moments acting on the blade. In one embodiment, the assembly boards are positioned substantially opposite to each other. Furthermore, the assembly boards on opposite sides of the blade may be identical.

In an alternative embodiment, an assembly board is wrapped around the trailing edge, thus acting on both sides of the blade. This assembly board may be V-shaped to fit around the trailing edge and may taper to a point of the tip of the V. An indentation at both sides of the blade, i.e. at both the windward shell and the leeward shell may ensure positioning of the V-shaped assembly board after having added an adhesive.

To increase the strength of the joint at the leading edge, the blade may further comprise a leading edge assembly board curved around the leading edge.

Alternatively or additionally, a leading edge assembly board may be fixed to the outer surfaces of the blade portions between the leading edge and the maximum thickness location.

As bonding may be carried out on site, the leading edge assembly board may be adhesively bonded to an outer surface of the sectional blade. Furthermore, bonding may be an advantage, in relation to creation of a joint which is completely fixed without the need for pre-tensioning.

At least one of the assembly boards may comprise multi-directional fibres in a matrix material. The fibres could be glass fibres, carbon fibres, synthetic fibres, bio fibres, or mineral fibres. The matrix material may include resin, such as an organic polymeric liquid which, when converted into its final state for use, becomes solid. As an example, the resin may be an epoxy-based resin or a polyester-based resin, though other resin types may also be applied.

As for a traditional wind turbine blade, the blade portions of the sectional blade may be made from a windward blade shell and a leeward blade shell, each having a shell thickness in the thickness wise direction. At least one of the assembly boards may have a thickness in the thickness wise direction which corresponds to less than 75 percent of the shell thickness.

As an example the shell thickness may be approximately 50 mm as the shell may be made as a sandwich construction comprising a core of 45 mm with 2.5 mm of a fibre material on both sides. In this embodiment, an assembly board having a thickness in the range of 5 mm will have a thickness corresponding to only 10% of the shell thickness. It should however be understood, that the shell thickness may vary along the junction as the shell thickness may taper towards the trailing edge of the blade.

The assembly board may comprise a structural reinforcement layer made of a fibre material in a matrix, such as glass fibres in a matrix material. This reinforcement layer may in one embodiment substantially form the assembly board. However, a coating or other types of layers may be added to the reinforcement layer.

The structural reinforcement layer of the assembly board may be at least as thick as the reinforcement layer of the blade shell at the position where the assembly board is adhered to the blade portions. This corresponds to the above example in which the assembly board has a thickness in the range of 5 mm and the blade shell comprises a reinforcement layer of approximately 5 mm fibre material in total.

However, it should be understood, that the assembly board may taper in the lengthwise direction so that the thickness of the assembly board may be thinner at the ends than at the middle section to improve the aerodynamic characteristics of the sectional blade.

The length of the assembly board may depend on the total length of the sectional blade, as the loads and moments acting on the joint depend on the length of the blade. Consequently, at least one of the assembly boards may have a length in the lengthwise direction which corresponds to 1-10 percent of the length of the sectional blade in the lengthwise direction.

Furthermore, at least one of the assembly boards may have a width in the crosswise direction which corresponds to 10-50 percent of the size of the sectional blade in the crosswise direction.

At least one of the assembly boards may have a non-uniform thickness in the thickness wise direction. In one embodiment, the assembly board may have the maximum thickness located approximately at the longitudinal centre of the board. However, in an alternative embodiment, the maximum thickness of the board may be located closer to one of the longitudinal edges of the assembly board, or even be located at one of the longitudinal edges. The shape and thereby the thickness of the assembly board may depend on the size of sectional blade and/or the location at which the wind turbine is to be erected. However, other aspects may also influence the shape and size of the assembly board(s).

In order to facilitate positioning of the assembly board, the blade portions may comprise at least one indentation in the outer surface. The indentation may have a shape which corresponds to the assembly board to enable countersink of the assembly board in the outer surface. This may further improve the aerodynamic characteristics of the sectional blade, as an assembly board positioned on the outer surface without being countersunk may disturb the aerodynamics.

In a second aspect, the invention provides a method of assembling a sectional blade for a wind turbine, the blade extending lengthwise between a tip and a root where the blade is attachable to a hub of a wind turbine, crosswise between a leading edge and a trailing edge, and thickness wise between a windward and a leeward outer surface, the blade forming, in a cross section perpendicular to the lengthwise direction, a maximum thickness location between the leading and trailing edges, the maximum thickness location being where the distance between the windward and leeward outer surfaces is larger than at any other location in this cross section, the method comprising the steps of providing a first blade portion and a second blade portion, the blade portions being formed as separate components;

providing an assembly board;

arranging the blade portions so that they extend lengthwise in opposite directions from a junction where the blade portions join; and adhesively joining the assembly board to an outer surface of both blade portions between the trailing edge and the maximum thickness location.

It should be understood, that the above-mentioned features of the first aspect of the invention may also be applicable in relation to the method of assembling a sectional blade for a wind turbine according to the second aspect of the invention. Thus, the second aspect may comprise any combination of features and elements of the first aspect of the invention.

In a third aspect, the invention provides a wind turbine comprising a sectional blade according to the first aspect of the invention. It should be understood, that the above-mentioned features of the previously described aspects may also be applicable to the third aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
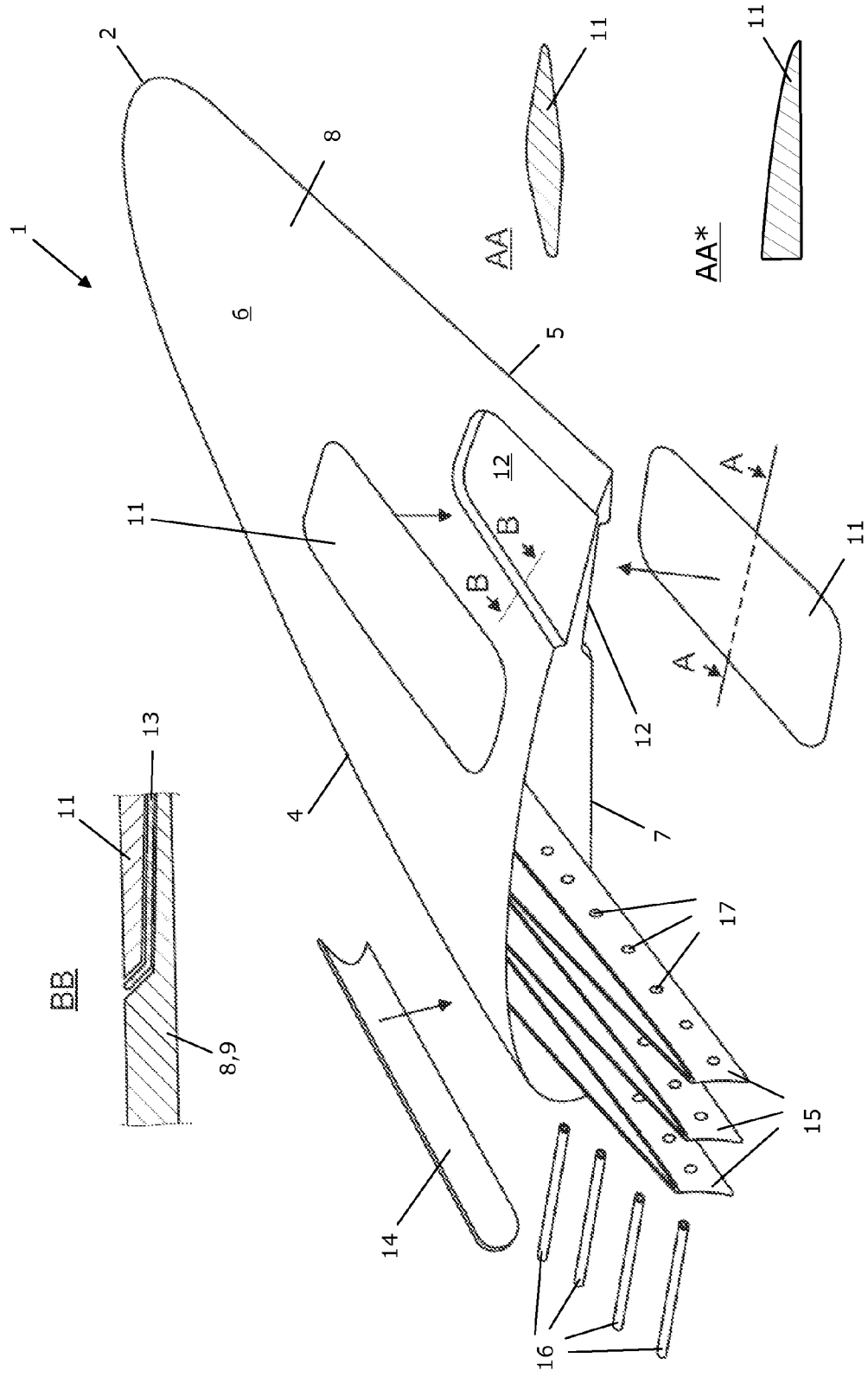
FIG. 1 illustrates a blade portion for a sectional blade for a wind turbine with an embodiment of an assembly board, section AA is a sectional view of an embodiment of an assembly board, section BB is a sectional view of an embodiment of an assembly board joined to an outer surface of a blade portion.
Figure 2:
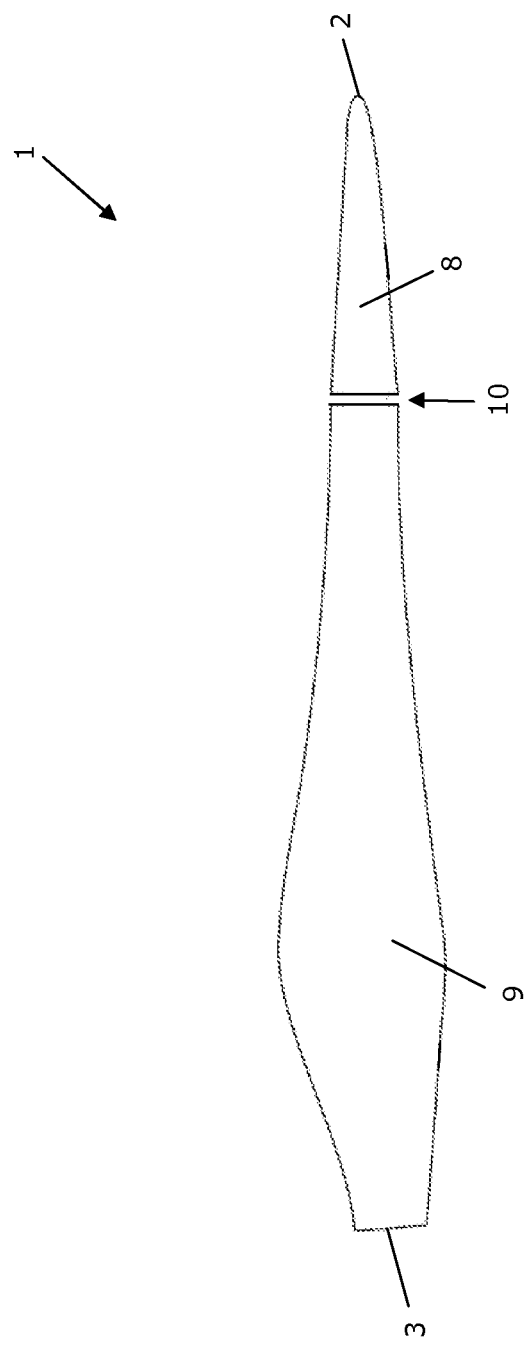
FIG. 2 illustrates a sectional blade.

FIGS. 1 and 2 illustrate a part of a sectional blade 1 for a wind turbine (not shown). The blade 1 extends lengthwise between a tip 2 and a root 3 where the blade 1 is attachable to a hub (not shown) of a wind turbine. The blade 1 further extends crosswise between a leading edge 4 and a trailing edge 5, and thickness wise between a windward and a leeward outer surface 6, 7. The sectional blade 1 comprises a first blade portion 8 and a second blade portion 9. The blade portions 8, 9 are formed as separate components and arranged to extend lengthwise in opposite directions from a junction 10 where the blade portions join. The blade 1 forms, in a cross section perpendicular to the lengthwise direction and through the junction 10, a maximum thickness location between the leading 4 and trailing edges 5, the maximum thickness location being where the distance between the windward and leeward outer surfaces 6, 7 is larger than at any other location in this cross section, The sectional blade 1 comprises an assembly board 11 which is adhesively joined to an outer surface of both blade portions 8, 9 between the trailing edge 5 and the maximum thickness location. Thereby it is possible to maintain a fixed position of one blade portion 8 relative to the other blade portion 9 against edgewise loads acting between the blade portions 8, 9.

In the illustrated embodiment, the distance from the assembly board 11 to the maximum thickness location is greater than the distance from the assembly board 11 to the trailing edge 5, i.e. the assembly board 11 is positioned closer to the trailing edge 5 than to the maximum thickness location.

The illustrated sectional blade 1 comprises two identical assembly boards 11, one on the outer surface of the windward side 6 and one on the outer surface of the leeward side 7 of the sectional blade. By adding an assembly board 11 to both sides of the sectional blade, the junction 10 has become stronger compared to a junction of a sectional blade comprising only one assembly board of the same shape and size.

As illustrated in section AA, the assembly boards 11 have a non-uniform thickness in the thickness wise direction. The assembly board 11 of section AA has a maximum thickness located approximately at the longitudinal centre of the board. However, in an alternative embodiment, as illustrated in section AA*, the maximum thickness of the assembly board 11 is located at one of the longitudinal edges of the board.

Furthermore, the assembly board 11 may taper in the lengthwise direction so that the thickness of the assembly board 11 may be thinner at the ends than at the middle section to improve the aerodynamic characteristics of the sectional blade 1.

In order to facilitate positioning of the assembly boards 11, the blade portions 8, 9 comprise an indentation 12 in the outer surfaces 6, 7. The indentations 12 have a shape which corresponds to the shape of the assembly board 11 to enable countersink of the assembly boards 11 in the outer surfaces 6, 7. This further improves the aerodynamic characteristics of the sectional blade 1. Section BB illustrates the assembly board 11 being adhesively joined to an outer surface of the blade portion 8, 9 by use of an adhesive 13 in detail.

To increase the strength of the junction 10 at the leading edge 4, the blade 1 further comprises a leading edge assembly board 14 curved around the leading edge. The sectional blade 1 further comprises three inserts 15 extending along the lengthwise axis into both blade portions 8, 9 to increase the strength and stiffness of the wind turbine blade. The inserts 15 are positioned in the area of the maximum thickness location where most space is provided internally in the blade cavity. The inserts 15 are secured to similar inserts (not shown) of the second blade portion 9 by means of fastening elements 16 which are inserted into fastening passages 17 of the inserts 15 whereby the fastening elements 16 extend in a direction transverse to the longitudinal direction of the sectional blade 1. It should be understood, that these types of inserts 15 are just examples of inserts which can be used in combination with an assembly board according to the present invention.

The invention claimed is:

1. A sectional blade for a wind turbine, the blade extending lengthwise between a tip and a root where the blade is attachable to a hub of a wind turbine, crosswise between a leading edge and a trailing edge, and thickness wise between a windward and a leeward outer surface, the sectional blade comprising:
   a first blade portion and a second blade portion, the blade portions being formed as separate components and arranged to extend lengthwise in opposite directions from a junction where the blade portions join, the blade forming, in a cross section perpendicular to the lengthwise direction and through the junction, a maximum thickness location between the leading and trailing edges, the maximum thickness location being where the distance between the windward and leeward outer surfaces is larger than at any other location in this cross section; and
   an assembly board extending across the junction and adhesively joined to an outer surface of both blade portions to define a region at the intersection of the junction and the assembly board entirely between the trailing edge and the maximum thickness location and having a first end that is closest to the trailing edge and a second end that is closest to the maximum thickness location, wherein the first end is spaced from the trailing edge and the second end is spaced from the maximum thickness location, and wherein the distance along the junction from the second end to the maximum thickness location is greater than the distance along the junction from the first end to the trailing edge.

2. The blade according to claim 1, further comprising an insert extending along the lengthwise axis into both blade portion and arranged to counteract flapwise loads on the blade.

3. The blade according to claim 1, further comprising a leading edge assembly board curved around the leading edge.

4. The blade according to claim 3, wherein the leading edge assembly board is fixed to the outer surfaces of the blade portions between the leading edge and the maximum thickness location.

5. The blade according to claim 3, wherein the leading edge assembly board is adhesively bonded to an outer surface of the sectional blade.

6. The blade according to claim 1, comprising an assembly board both on the windward and on the leeward surface of the sectional blade.

7. The blade according to claim 1, wherein the assembly board comprises multi-directional fibres in a matrix material.

8. The blade according to claim 1, wherein the blade portions are made from a windward blade shell and a leeward blade shell, each having a shell thickness in the thickness wise direction, and wherein the assembly board has a thickness in the thickness wise direction which corresponds to less than 75 percent of the shell thickness.

9. The blade according to claim 1, wherein the assembly board has a length in the lengthwise direction which corresponds to 1-10 percent of the length of the sectional blade in the lengthwise direction.

10. The blade according to claim 1, wherein the assembly board has a width in the crosswise direction which corresponds to 10-50 percent of the size of the sectional blade in the crosswise direction.

11. The blade according to claim 1, wherein the assembly board has a non-uniform thickness in the thickness wise direction.

12. The blade according to claim 1, wherein the blade portions comprises at least one indentation in the outer surface, the indentation having a shape corresponding to an assembly board to enable countersink of the assembly board in the outer surface.

13. A method of assembling a sectional blade for a wind turbine, the blade extending lengthwise between a tip and a root where the blade is attachable to a hub of a wind turbine, crosswise between a leading edge and a trailing edge, and thickness wise between a windward and a leeward outer surface, the blade forming, in a cross section perpendicular to the lengthwise direction, a maximum thickness location between the leading and trailing edges, the maximum thickness location being where the distance between the windward and leeward outer surfaces is larger than at any other location in this cross section, the method comprising:
   providing a first blade portion and a second blade portion, the blade portions being formed as separate components;
   providing an assembly board;
   arranging the blade portions so that they extend lengthwise in opposite directions from a junction where the blade portions join; and
   adhesively joining the assembly board to an outer surface of both blade portions so as to extend across the junction to define a region at the intersection of the junction and the assembly board entirely between the trailing edge and the maximum thickness location and having a first end that is closest to the trailing edge and a second end that is closest to the maximum thickness location, wherein the first end is spaced from the trailing edge and the second end is spaced from the maximum thickness location, and wherein the distance along the junction from the second end to the maximum thickness location is greater than the distance along the junction from the first end to the trailing edge.

14. A wind turbine comprising a sectional blade according to claim 1.

* * * * *